Nov. 7, 1933.  V. C. CANTER  1,934,619
AIR FILTER
Filed March 16, 1931  2 Sheets-Sheet 1
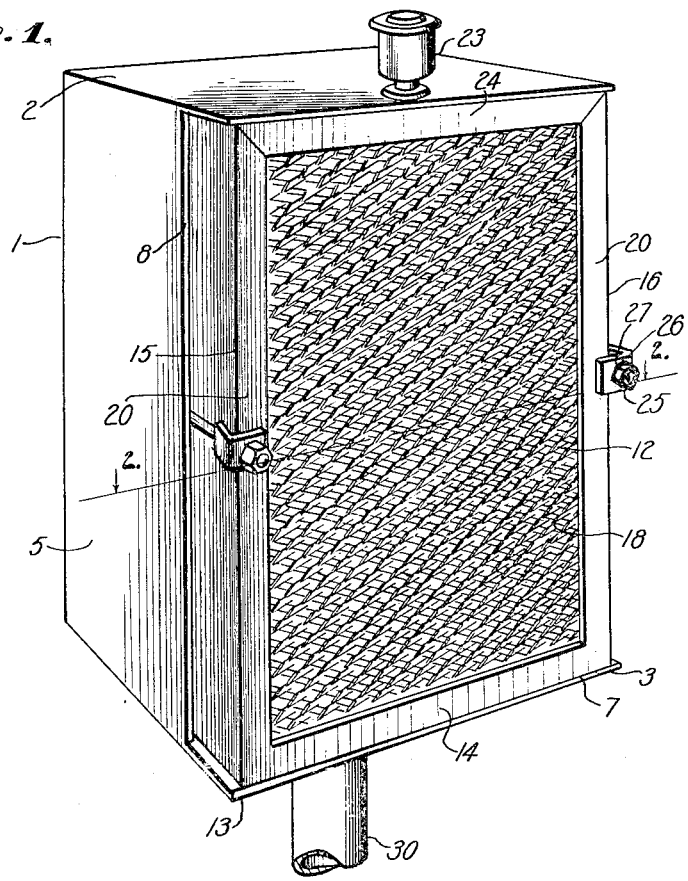
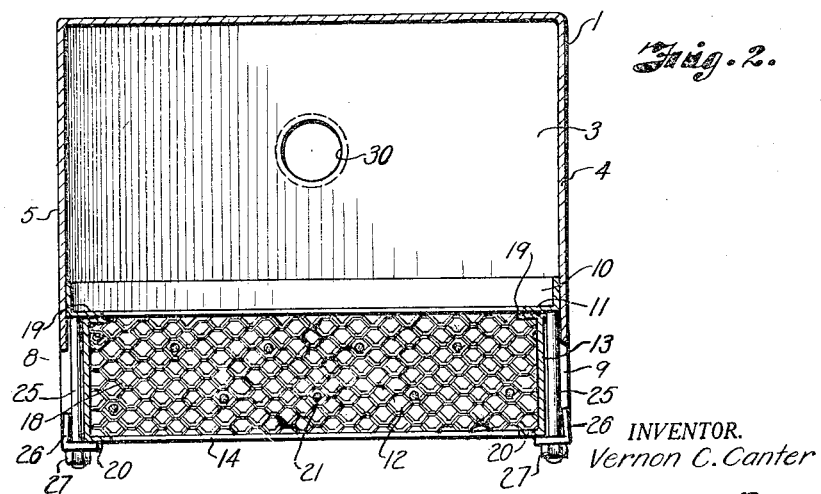
INVENTOR.
Vernon C. Canter
ATTORNEY.

Nov. 7, 1933.  V. C. CANTER  1,934,619
AIR FILTER
Filed March 16, 1931  2 Sheets-Sheet 2

INVENTOR.
Vernon C. Canter
BY Arthur C. Brown
ATTORNEY.

Patented Nov. 7, 1933

1,934,619

UNITED STATES PATENT OFFICE 1,934,619

AIR FILTER

Vernon C. Canter, Tulsa, Okla., assignor to B. W. Vinson, Tulsa, Okla.

Application March 16, 1931. Serial No. 522,947

2 Claims. (Cl. 183—21)

This invention relates to filters and more particularly to those of that character for removing dust, dirt and solid bodies which are carried in suspension in air and gas streams, the principal objects of the invention being to provide a more efficient filter having minimum pressure drop caused by resistance of the gas flowing through the filtering media, to provide a filter which is not easily clogged and that may be readily cleaned of the material collected therein, and to maintain efficiency of the filter by providing automatic feed of adhesive liquid covering the filter elements to replace liquid evaporated and to prevent drying due to action of the gas passing through the filter.

It is a further object of the invention to apply the adhesive liquid in such a manner that it is not carried away in large particles by the gas stream.

In accomplishing these and other objects of the invention, I have provided improved details of structure, the preferred form of which is illustrated in the accompanying drawings, wherein:

Fig. 1 is a perspective view of a filter constructed in accordance with my invention.

Fig. 2 is a horizontal sectional view through the filter on the line 2—2, Fig. 1.

Figure 3:
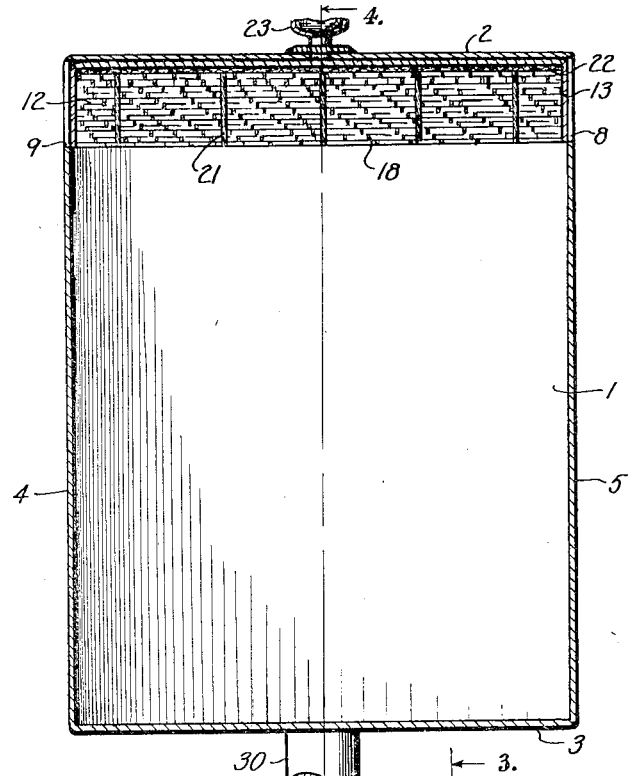
Fig. 3 is a vertical sectional view on the line 3—3, Fig. 4.

Referring in detail to the drawings:

1 designates preferably a rectangular sheet metal housing having top and bottom walls 2 and 3, side walls 4 and 5, a rear wall 6 and an open front 7, the side walls 4 and 5 being preferably cut away adjacent the front of the housing 7, as at 8 and 9, leaving the top and bottom walls extending to support the filtering element later described. Fixed in alignment with the cutout portions of the housing and extending around the interior thereof, is an angle iron rail 10 having an inwardly extending flange 11 forming a peripheral seat for the filtering element now described.

The filtering element is generally designated 12 and preferably comprises a channel-shaped frame 13 of sufficient dimensions to be snugly received within the opening and seated against the flanges 11 of the angle iron 10 to make a substantially air tight joint. The frame 13 is preferably formed by bending a continuous strip of channel-shaped material to form a bottom rail 14 and side rails 15 and 16, leaving an opened top portion through which the filtering elements are inserted.

The filtering elements preferably comprise a plurality of juxtaposed, horizontally arranged sheets 18 each constructed of reticulated material which may be of ordinary expanded metal lath having substantially rectangular openings, a sufficient number of layers of the lath being inserted to entirely fill the channel frame 13 and form a honey-combed baffle element having large contact areas for the air but sufficient voids to afford free flow therethrough.

By reason of the horizontal arrangement of the sheets 18 irregular, vertical passages of substantially rectangular cross section are formed in the filtering element by the openings in the sheets and inserted in selected of these passages throughout the depth of the filtering element are a plurality of spaced strips of wicking or the like for feeding an adhesive covering to the filtering elements through capillary attraction from a source of supply later described. The strips in the vertical passages are preferably arranged in rows staggered with relation to each other so that the strips in one row do not fall in alignment with the strips in another row as shown in Fig. 2.

Supported on the top edges of the layers of metal lath and contacting the strips of wicking 21 is a sheet of felt or wicking material 22 for distributing the adhesive material to the strips from an ordinary oil lubricator 23 carried at the top of the housing. After the filter elements including the wicking have been placed in the frame the open upper end of the frame is closed by a cross rail 24 complementary to the lower rail, which may be secured to the side rails 15 and 16 by welding or the like to form a continuous frame.

The frame is clamped to the housing by stud bolts 25 which extend from the flanges of the angle iron 10 adjacent the sides of the frame, and project beyond its outer face to receive angle shaped clips 26 for overlying the frame. Nuts 27 are threaded on the projecting ends of the studs to retain the clips as shown in Figs. 1 and 2.

The top rail 24 of the frame is provided with an opening 28 which aligns with the lubricator 23 to admit the adhesive material to the distributing layer of felt.

The housing 1 is also provided with a conduit 30 here shown as communicating with the bottom thereof for connection to a source of air supply or delivery as the case may be, it being apparent that the air or gas may be discharged in either direction through the filter element depending on the purpose for which the filter is used and that the air may be sucked through the filter element or discharged therethrough with a positive pressure depending on which side of the pumping apparatus the filter is placed.

In using a filter constructed as described the filter unit is immersed in a viscous liquid which may be an oil of mineral, vegetable or animal origin, to saturate the wicking and to cover the filtering media with a viscous film. The unit is then placed in the housing and anchored in position by the bolts 25. The lubricator is then filled with the adhesive liquid to replace that evaporated off the surface of the filter media.

The lubricator is adjusted to drop the adhesive slowly into the top layer of wicking, preferably by a wick received in the lubricator and contacting the wicking which feeds the material by capillary attraction to the strips of wicking inserted between the foraminate metal sheets to spread thereover in a very fine film replacing the liquid lost by evaporation and keeping the filtering media moist at all times.

The speed of the liquid may be governed by the viscosity of the liquid employed and by the type of wicking with which the filter is equipped.

Figure 4:
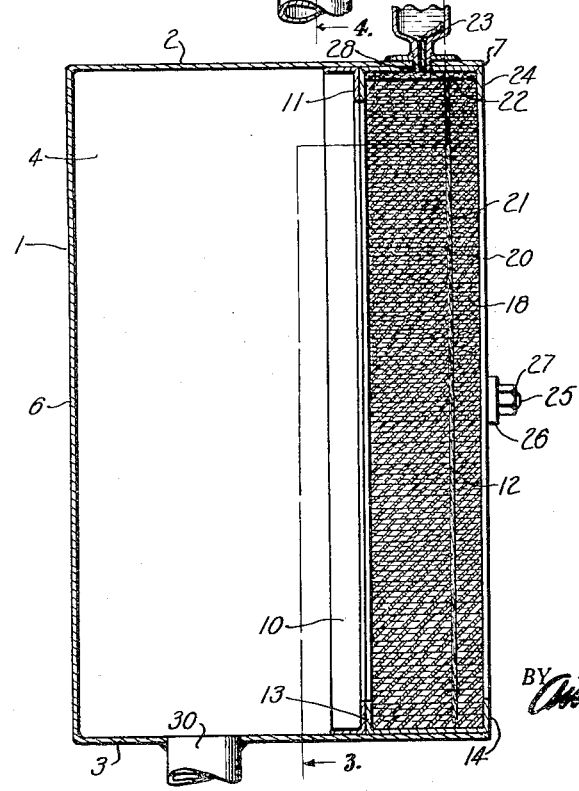
Fig. 4 is a vertical sectional view on the line 4—4, Fig. 3.

The air passing through the filter from right to left as viewed in Fig. 4, is forced to flow through extremely tortuous passages formed by the partly overlapping relation of the openings in one sheet with those in a juxtaposed sheet, as clearly shown in this figure. Dirt, dust and the like carried by the air contacts the filtering media and is deposited on the plates covered by the adhesive material. As the adhesive becomes laden with the dirt particles the liquid fed from the wicking saturates the material caught and maintains it in moist condition, thereby preventing it from breaking away and keeping it in condition for catching and holding other particles which enter with the air. Thus the efficiency of the filter does not necessarily decrease as the operating period increases but the efficiency may be maintained over relatively long periods until such a time that the built up dirt particles have accumulated to such an extent that they interfere with the flow of air.

It is then necessary to remove the filter unit and clean it of the accumulated solids. This can be readily accomplished by washing the filtering unit in gasoline or other solvent after which the unit may again be coated with an initial film of adhesive and replaced as before.

It is therefore apparent that the filter may operate for long intervals between cleaning periods, thereby lowering cost of maintenance and operation.

While I have described a filter having a single filtering unit it is apparent that multiple units may be employed in the side of the housing and that the shape of the housing may be varied to accommodate the additional units. It is also to be noted that while I have specifically referred to air throughout the specification, the filter is well adapted to filter gases, vapors and gaseous mixtures without departing from the spirit of the invention.

What I claim and desire to secure by Letters Patent is:

1. An air filter element comprising a plurality of horizontally arranged superimposed layers of expanded metal lath forming irregular vertical passages of substantially rectangular cross section, means for retaining said layers in assembled condition to form a porous baffle element, and a plurality of spaced strips of wicking extended through some of said vertical passages for feeding an adhesive covering over said baffle element.

2. An air filter element comprising a plurality of superimposed layers of horizontally arranged expanded metal lath forming irregular vertical passages, means for retaining said layers in assembled condition to form a porous baffle element, and a plurality of spaced strips of wicking extended through some of said vertical passages for feeding an adhesive covering over said baffle element.

VERNON C. CANTER.